United States Patent
Chen

(10) Patent No.: US 7,543,787 B2
(45) Date of Patent: Jun. 9, 2009

(54) MONITOR HOLDER FOR PROVIDING STABLE SUPPORT

(75) Inventor: Wen-Chun Chen, Tao Yuan (TW)

(73) Assignee: Hoolin Research Company Limited, Tao Yuan (TW)

( * ) Notice: Subject to any disclaimer, the term of this patent is extended or adjusted under 35 U.S.C. 154(b) by 90 days.

(21) Appl. No.: 11/798,324

(22) Filed: May 11, 2007

(65) Prior Publication Data

US 2008/0278652 A1    Nov. 13, 2008

(51) Int. Cl.
   A47B 96/00    (2006.01)
   A47B 23/04    (2006.01)
   G06F 1/16     (2006.01)

(52) U.S. Cl. .......................... 248/225.21; 248/289.11; 361/681

(58) Field of Classification Search .............. 248/289.1, 248/551, 220, 220.21, 220.22, 221.11, 223.31, 248/225.21, 917; 361/681
   See application file for complete search history.

(56) References Cited

U.S. PATENT DOCUMENTS 4,487,389 A * 12/1984 Ziegler ................... 248/282.1
5,165,644 A * 11/1992 Allen ...................... 248/285.1
5,927,666 A *  7/1999 Barkan ................... 248/225.11
7,048,242 B2 *  5/2006 Oddsen, Jr. ............ 248/280.11

FOREIGN PATENT DOCUMENTS

GB    2439913 A *  1/2008

* cited by examiner

Primary Examiner—Anita M King
(74) Attorney, Agent, or Firm—Troxell Law Office, PLLC

(57) ABSTRACT

A stable monitor holder includes a fixing frame, a bracing device and a support frame. The support frame is coupled with the fixing frame to couple the fixing frame with the bracing device. The support frame includes an upper hook plate and a lower hook plate, which has a hook part. The bracing device includes a bracing frame, a coupling plate, a control structure and a hook plate. The coupling plate is coupled to the bracing frame. The coupling plate includes a crossing part, a protruding part and a connecting plate. The connecting plate has a retention device and a through hole. The control means has an operation part on the outside and two first shaft parts and a positioning dowel on the inside. The hook plate has a hook part, two through openings and a positioning hole, and has a multistage slot on an upper edge.

1 Claim, 7 Drawing Sheets

MONITOR HOLDER FOR PROVIDING STABLE SUPPORT

FIELD OF THE INVENTION

The present invention relates to a monitor holder for fixing a monitor, and more particularly to a monitor holder for providing stable support that is easy to assembly and easy to embody and able to provide simple burglarproof function.

BACKGROUND OF THE INVENTION

With the popularization of 3C products and the progress of technology, the traditional CRT monitors are gradually replaced by the LCD monitors, which are progressively accepted by the general publics. The general LCD monitor can be placed on the table by the use of the stand. In addition, the LCD monitor has a small size and a light weight so it is suitable to be held and supported by the monitor holder.

The typically LCD monitor support device generally comprises a base. In addition, a support arm is pivotally mounted on the base, and a fixing plate is connected to the upper end of the support arm for fixing the LCD monitor. In addition, the fixing plate also enables the LCD monitor to be angle-adjustable so as to obtain better view angle.

However, the traditional monitor support device only enables the LCD monitor to be forward or backward tiltable. The traditional monitor support device does not satisfy the requirement to use the LCD monitor over a wide range of application.

Another traditional hanging-type monitor holder generally can be placed by the use of the weight of the LCD monitor directly. There is still a need to improve the fixing effect since no fixing structure is provided in this monitor holder.

SUMMARY OF THE INVENTION

It is an object of the present invention to disclose a monitor holder for providing superior support. The monitor holder of the present invention that provides stable support is easy to assembly and can be accomplished without the need of using many tools. The hook plate, which is mounted on the coupling plate of the bracing device, can be steadily coupled with the lower hook plate of the support frame so that the support frame on which the LCD monitor is mounted can be steadily interlocked with the bracing device. As a result, the LCD monitor is lockable or unlockable to provide simple burglarproof function.

In order to achieve the foregoing object, a monitor holder for providing stable support comprises a fixing frame, a bracing device and a support frame. The support frame is coupled with the fixing frame so as to couple the fixing frame with the bracing device. The support frame comprises an upper hook plate and a lower hook plate on an upper end and a lower end respectively, wherein the lower hook plate has a hook part. The bracing device comprises a bracing frame, a coupling plate, a control means and a hook plate, wherein the coupling plate can be coupled to the bracing frame. The coupling plate comprises a crossing part, a protruding part and a connecting plate. The connecting plate has a retention device and a through hole. The control means has an operation part on the outside, and also has two first shaft parts and a positioning dowel on the inside. The hook plate has a hook part, two through openings and a positioning hole. The hook plate has a multistage slot on an upper edge.

These two first shaft parts and the positioning dowel of the control means can be inserted through the through hole, these two through openings and the positioning hole. As a result, these two first shaft parts are leftward or rightward shiftable within these two elongated holes that have the fixed lengths. Two smaller-diameter second shaft parts are mounted respectively on the edges of these two first shaft parts for securely positioning in these two through openings. The positioning dowel is designed to be positioned in the positioning hole. When the operation part of the control means is shifted, these two first shaft parts of the control means are shiftable in these elongated holes so as to drive the hook plate to shift leftward or rightward by the second shaft parts.

DETAILED DESCRIPTION OF THE PREFERRED EMBODIMENT

Figure 1:
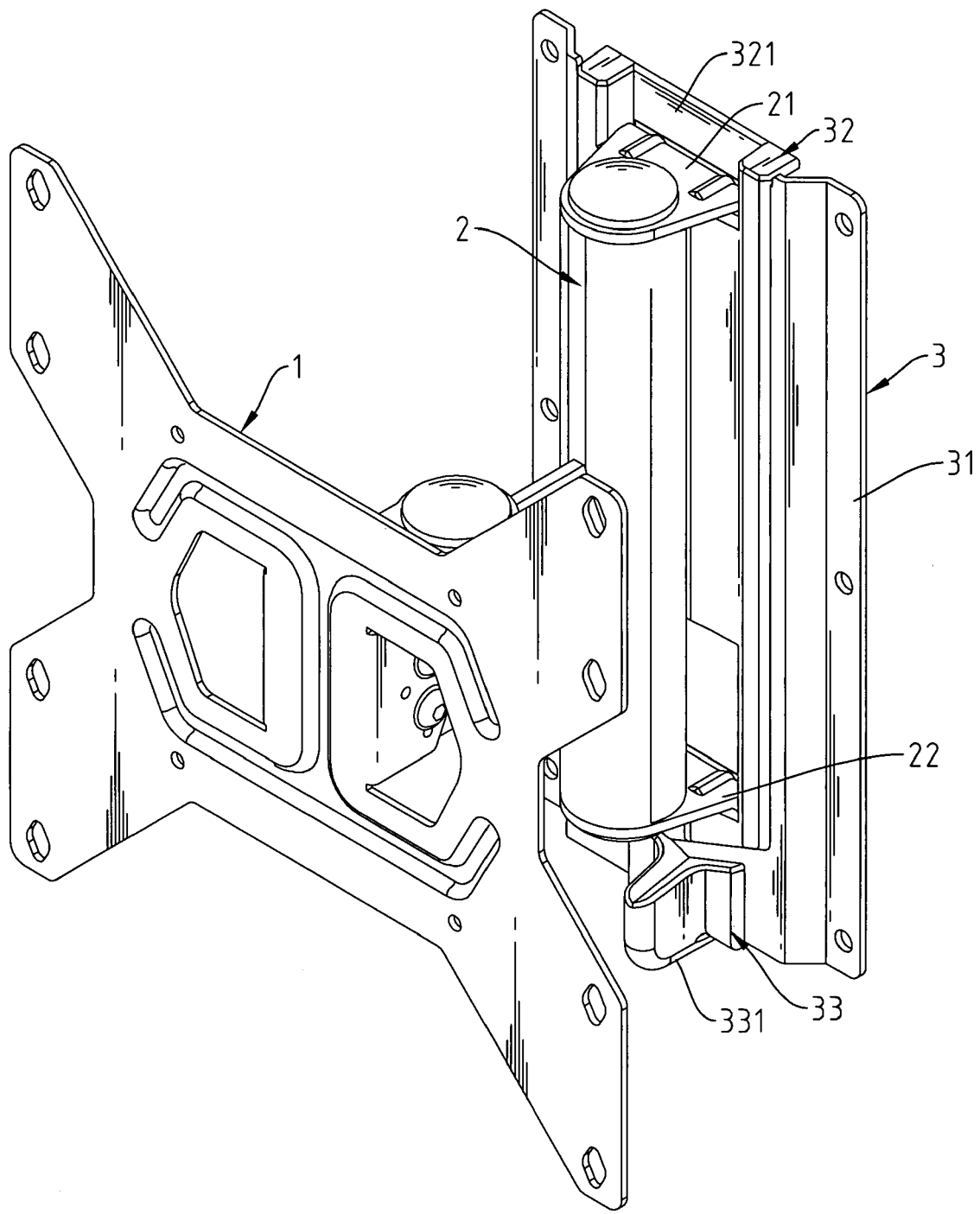
FIG. 1 is an elevational view of the present invention.

Referring to FIG. 1 through FIG. 3 and FIG. 7, a monitor holder for providing stable support of the present invention comprises a fixing frame 1, a support frame 2 and a bracing device 3, wherein the fixing frame 1 is coupled with the support frame 2. An upper hook plate 21 and a lower hook plate 22 are mounted on the upper and lower ends of the support frame 2, respectively, wherein the lower hook plate 22 has a hook part 221. The support frame 2 is designed for fixedly coupling the fixing frame 1 with the bracing device 3.

Figure 2:
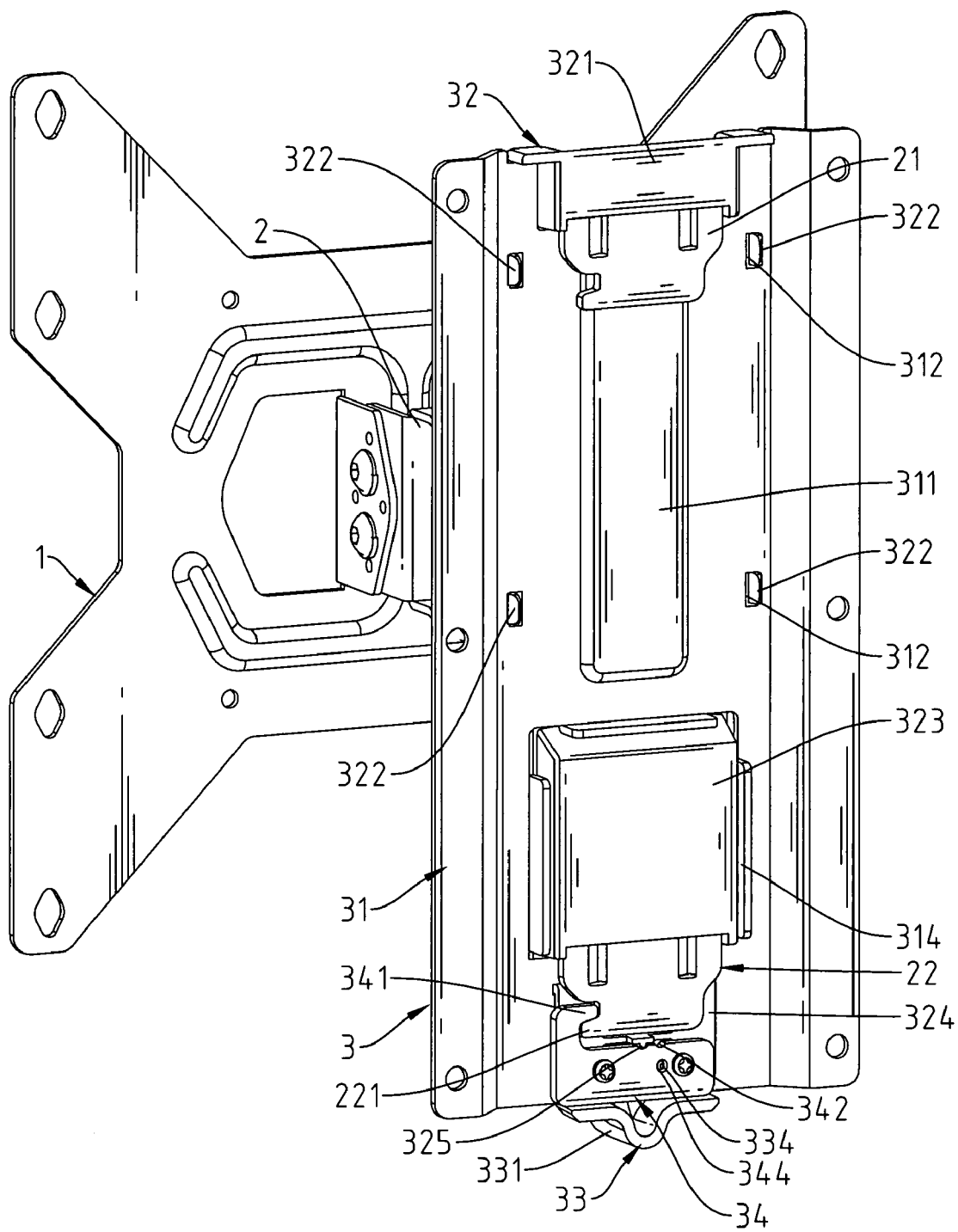
FIG. 2 is another elevational view of present invention taken from another direction.
Figure 3:
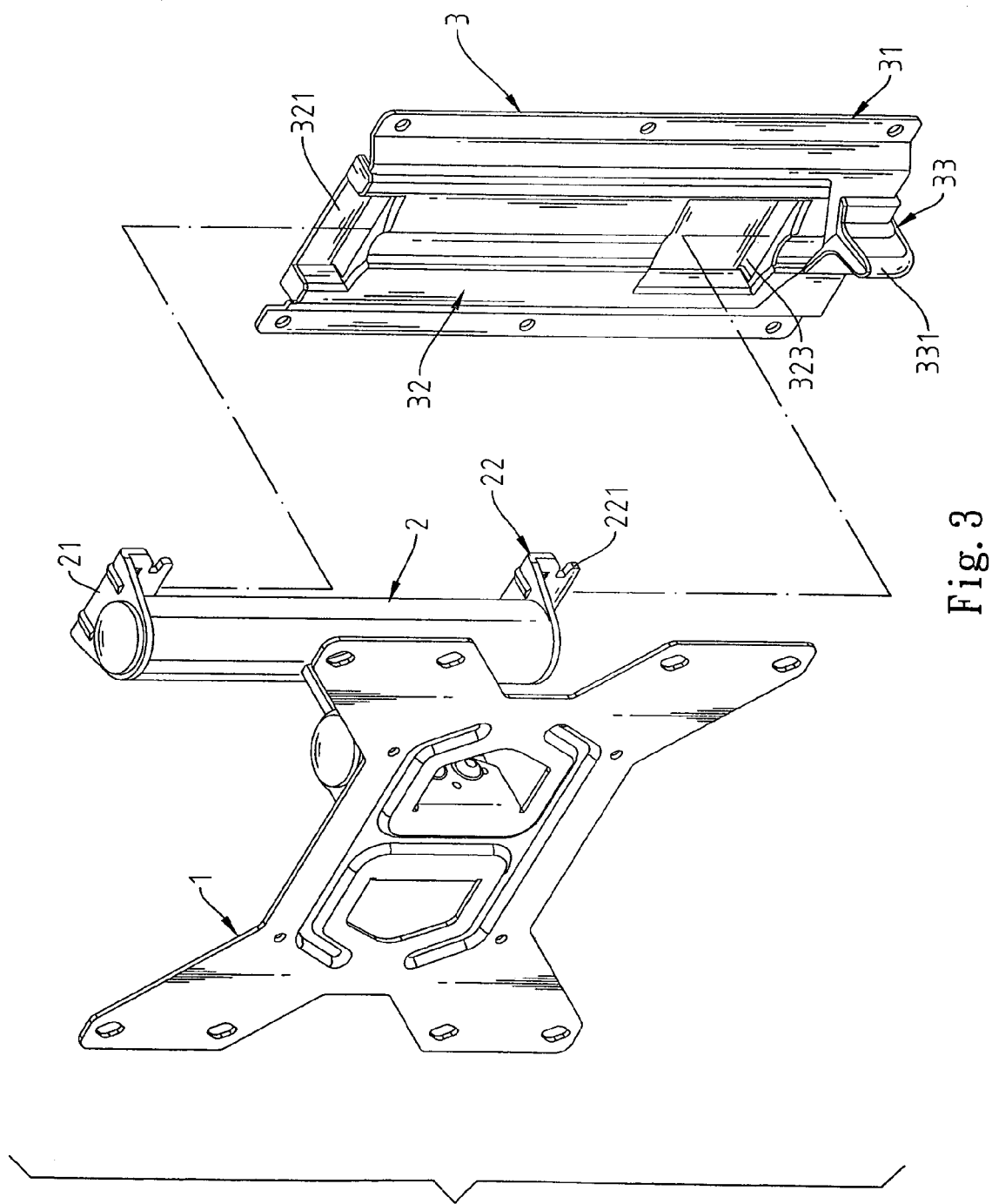
FIG. 3 is schematic, partial exploded view of the present invention.
Figure 4:
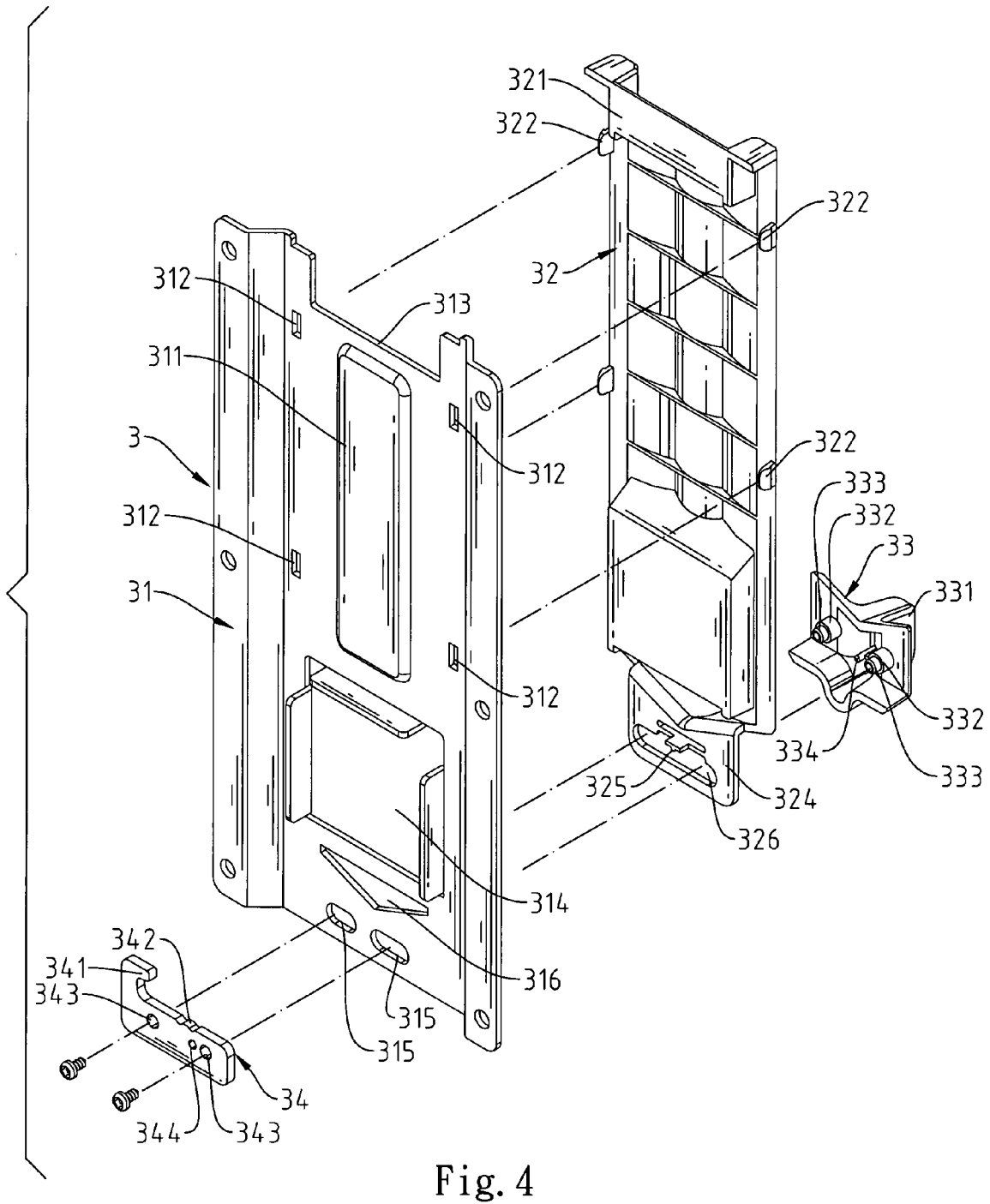
FIG. 4 is an elevational, exploded view showing the bracing device of the present invention.

Referring to FIG. 2 through FIG. 4, the bracing device 3 capable of providing stable support is shown. The bracing device 3 comprises a bracing frame 31, a coupling plate 32, a control means 33 and a hook plate 34, wherein the bracing frame 31 has a recessed part 313 on the upper end and a protruding part 311 on the body. In addition, the bracing frame 31 further has several through holes 312 formed thereon. In addition, a frame hole 314 is formed on the lower end of the bracing frame 31. At least one elongated hole 315 is formed under the frame hole 314. The coupling plate 32 is attachable to the bracing frame 31. The coupling plate 32 comprises a crossing part 321, a protruding part 323 and a connecting plate 324. The crossing part 321 can be held in and coupled with the recessed part 313 of the bracing frame 31. Several protruding plates 322 are mounted on the edges of the coupling plate 32 for inserting into the through holes 312 of the bracing frame 31 so that the protruding part 323 can be inserted into the recessed part 314 of the bracing frame 31 and that the connecting plate 324 extending from the lower end of the coupling plate 32 can be inserted into a holding slot 316. The connecting plate 324 has a retention device 325 and a through hole 326. After coupling with the bracing frame 31, the coupling plate 32 can be fixed on the bracing frame 31 by the control means 33 and the hook plate 34.

The control means 33 has an operation part 331 on the outside. The control means 33 also has two first shaft parts 332 and a positioning dowel 334 on the inside. The hook plate 34 has a hook part 341, two through openings 343 and a positioning hole 344. In addition, the hook plate 34 also has a multistage slot 342 on the upper edge.

These two first shaft parts 332 and the positioning dowel 334 of the control means 33 can be inserted through the through hole 326, these two through openings 343 and the positioning hole 344 via the front surface of the coupling plate 32. As a result, these two first shaft parts 332 are leftward or rightward shiftable within these two elongated holes 315 that have the fixed lengths. Two smaller-diameter second shaft parts 333 are mounted respectively on the edges of these two first shaft parts 332 for securely positioning in these two through openings 343. The positioning dowel 334 is designed to be positioned in the positioning hole 344. When the operation part 331 of the control means 33 is shifted, these two first shaft parts 332 of the control means 33 are shiftable in these elongated holes 315 so as to drive the hook plate 34 to shift leftward or rightward by the second shaft parts 333.

Figure 5:
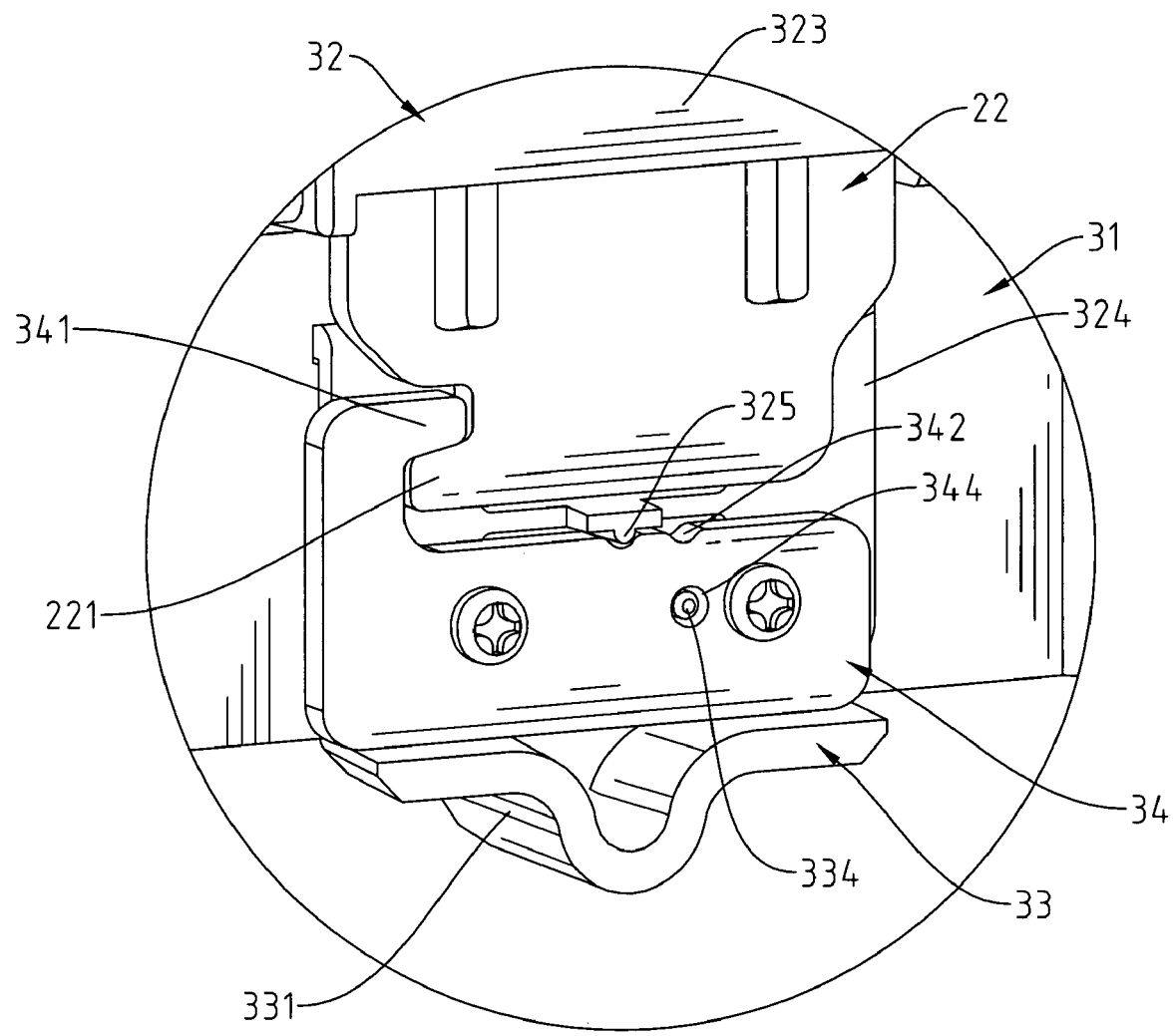
FIG. 5 is a partial enlarged, elevational view showing the bracing device and the support frame of the present invention.
Figure 6:
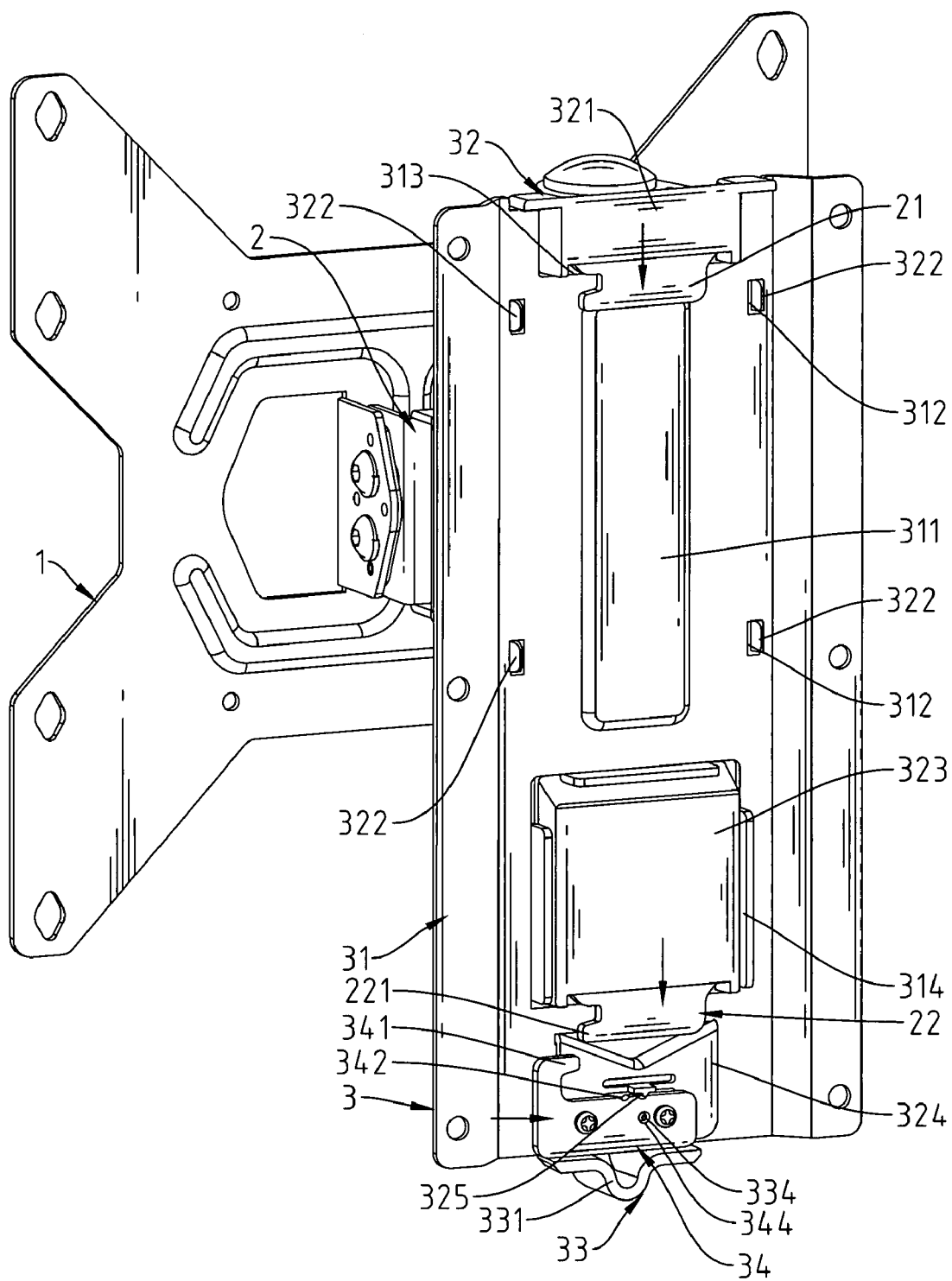
FIG. 6 is a schematic view showing that the bracing device is not coupled with the support frame of the present invention.

Referring to FIG. 5 and FIG. 6, the coupling between the support frame 2 and the bracing device 3 is shown. When the support frame 2 is coupled with the bracing device 3, the upper hook plate 21 and the lower hook plate 22 of the support frame 2 can be inserted into the trenches under the crossing part 321 and the protruding part 323 so that the upper hook plate 21 and the lower hook plate 22 can be extended to the backside of the coupling plate 32, wherein the lower hook plate 22 is located above the retention device 325 of the connecting plate 324. When the support frame 2 is positioned in position, the control means 33 can be shifted to engage the hook part 341 of the hook plate 34 with the hook part 221 of the lower hook plate 22 or disengage them from each other.

Figure 7:
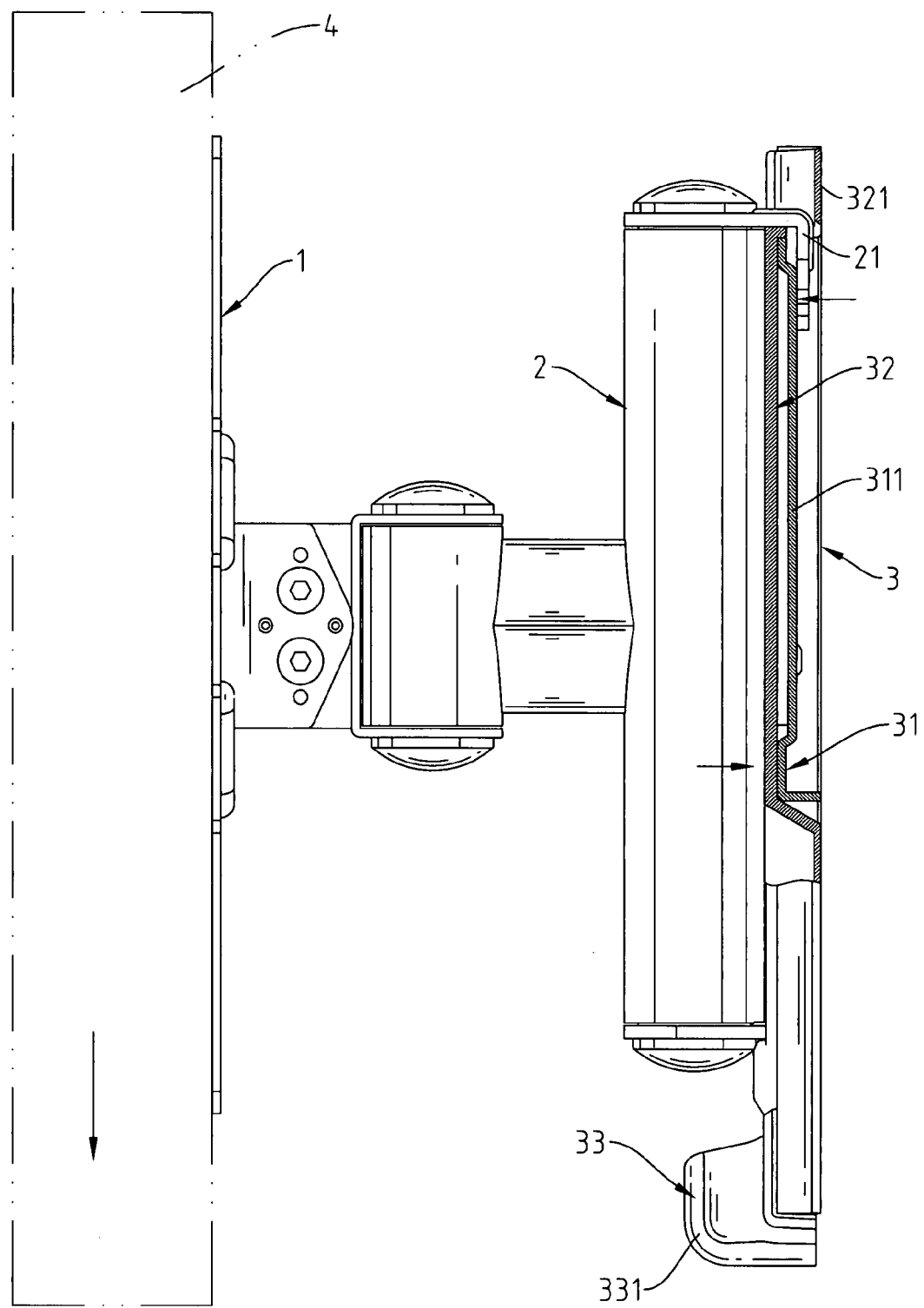
FIG. 7 is a partial cross-sectional view showing that the LCD monitor is attached to the monitor holder of the present invention.

Referring further to FIG. 7, the coupling between a LCD monitor 4 and the monitor holder for providing stable support of the present invention is shown. The LCD monitor 4 has a certain weight that causes the bracing device with poor support effect to tilt forward. The monitor holder of the present invention is capable of improving this problem. When the support frame 2 of the present invention is coupled with the bracing device 3, they have a larger area of contact to protect the support frame 2 from tilting forward.

What the invention claimed is:

1. A monitor holder for providing stable support, comprising:

a fixing frame; a bracing device; and a support frame for coupling with said fixing frame so as to couple said fixing frame with said bracing device;

said support frame comprising an upper hook plate and a lower hook plate respectively on an upper end and a lower end, said lower hook plate having a hook part;

said bracing device comprising a bracing frame, a coupling plate, a control means and a hook plate, said bracing frame having a recessed part on an upper end and a frame hole on a lower end, said bracing device having at least one elongated hole formed under said frame hole, said coupling part being attachable to said bracing frame, said coupling plate comprising a crossing part, a protruding part and a connecting plate, said crossing part being held in and coupled with said recessed part of said bracing frame, said protruding part being inserted into said frame hole of said bracing frame, said connecting plate extending from the lower end of said coupling plate being inserted into a holding slot, said connecting plate having a retention device and a through hole, said control means having an operation part on the outside, said control means also having two first shaft parts and a positioning dowel on the inside, said hook plate having a hook part, two through openings and a positioning hole, said hook plate having a multistage slot on an upper edge; and said two first shaft parts and said positioning dowel of said control means being inserted through said through hole, said two through openings and said positioning hole so that said two first shaft parts are leftward or rightward shiftable within said two elongated holes that have fixed lengths, two smaller-diameter second shaft parts being mounted respectively on edges of said two first shaft parts for securely positioning in said two through openings, said positioning dowel being designed to be positioned in said positioning hole so that when said operation part of said control means is shifted, said two first shaft parts of said control means are shiftable in said elongated holes so as to drive said hook plate leftward or rightward by said second shaft parts.

* * * * *